Nov. 6, 1956  H. LOESCHCKE ET AL  2,769,365
COUNTING DEVICE FOR MICROSCOPIC PARTICLES
Filed Nov. 8, 1951  7 Sheets-Sheet 1

INVENTORS
Hans Loeschcke and
BY Rutger Wever

United States Patent Office 2,769,365
Patented Nov. 6, 1956

2,769,365

COUNTING DEVICE FOR MICROSCOPIC PARTICLES

Hans Loeschcke and Rütger Wever, Göttingen, Germany

Application November 8, 1951, Serial No. 255,506

Claims priority, application Germany August 22, 1949

6 Claims. (Cl. 88—14)

The present invention relates to a device for counting the number of microscopic particles suspended in a translucent medium such as a liquid, and particularly for counting the number of red or white blood corpuscles suspended in serum.

This application is a continuation-in-part of the copending U. S. application, Serial No. 127,315, filed November 15, 1949, now abandoned, for "Measuring Instrument for the Counting of Floating Particles e. g. in Suspensions and Emulsions."

In the parent application a method and a device for counting the number of microscopic solid, liquid or gaseous particles suspended in a translucent liquid or solid or gaseous medium, particularly of blood particles or bacteria, is disclosed in which a beam of light emitted by a light source is guided through the liquid and the intensity of the portion of the light which has partly directly passed the liquid and partly been diffracted and diffused by the microscopic particles suspended in the medium or liquid is measured photoelectrically. According to the method and the device disclosed in the parent application, only a portion of the light which does not directly pass the medium but is diffracted and diffused by the particles is used for the excitation of the light-sensitive measuring cell, this portion lying within an angular space having an apex coinciding with the center of diffraction and being arranged coaxially with the optical axis and which, according to the predetermined size range of the particles to be counted, is limited by optical means so that the measurement is practically independent of the size of the particles within the predetermined size range.

According to the method and the device disclosed in the parent application, the light sensitive measuring cell is excited by a portion of the total light passing through the liquid, said portion containing neither the light passing directly, i. e. without scattering and diffracting through the liquid nor the contiguous portion of the diffracted and diffused light, which together occupy an angular space and are not used for exciting the light-sensitive measuring cell, this contiguous portion together with the light directly passing through the liquid forming a central light beam being coaxial with the optical axis and to which the light-sensitive cell is not exposed.

In the device, according to the parent application, a central diaphragm is used for eliminating this central portion of the light which also screens off the peripheral angular range outside the angular range used for measuring purposes, the outer edge of the diaphragm opening forming with the center of diffraction an angle with respect to the optical axis which is large compared to the opening angle of the central light cone screened off by the diaphragm. By this it is accomplished that the screened off peripheral part of the light beam obtained by diffraction and diffustion is small i. e. it is situated within the range of the diffracted light cone in which the light intensity which decreases towards the outside owing to the scattering effect has practically no importance for the measurement of the intensity.

According to the parent application, the magnitude of the central portion to be screened off of the light cone can be found by plotting for the wave length of the light source used for the method or device in each case, the intensity for the various particle sizes against the angle $\varphi$ formed at the center of diffraction in a diagram showing that value of the angle $\varphi$ for which the intensity is independent of the particle size within a predetermined size range.

The determination of the angle $\varphi$ for the central angular space to be screened off by calculation and, if desired, by measurement, is too complicated for the practical application of the measuring instrument.

Even more complicated and tedious is a well-known process according to which first the average size or diameter of the particles to be counted is derived from the diffraction rings obtained on a ground glass plate arranged behind the liquid, and then an instrument is used for measuring the intensity in which only the light directly passing through the liquid is prevented from reaching the light-sensitive measuring cells by a diaphragm or equivalent optical means. Since in this method the measuring of the intensity depends on the size of the particles suspended in the liquid, the influence of the particle size on the result of the measurement has to be eliminated afterwards to a certain extent by comparative experimental results in connection with the particle size derived from the diffraction rings.

It is an object of the present invention to avoid all these complications.

It is another object of the present invention to provide a device for counting the number of particles suspended in a medium for instance a liquid in which the result of the measurement can be directly read off and is a measure for the number of particles in unit volume or for the concentration of the particles in the medium. In order to accomplish this, according to the present invention the method described heretofore in general terms is carried out by placing the angular space of the used portion of the light beam on one side of a conical surface, the other side of which corresponds to the non-used portion of the light beam obtained by diffraction and scattering, the half aperture angle $\varphi$ of which formed with the optical axis being practically half as large as the angle formed with the optical axis by the light rays which would form the first diffraction ring on a screen placed in the plane of the measuring cell. The angle can be approximately calculated from the equation $$\sin \varphi_1 = 0.73 \frac{\lambda}{\sqrt{f_m}}$$

in which $\lambda$ is the mean length of the light used for the measuring and $f_m$ is the mean cross-sectional area of the particles to be counted in a range of particle sizes for which the intensity measured by $\varphi_1$ at a constant number of particles practically stays constant, the scale for intensity-measurings on the measuring device being calibrated only on the number of particles.

The radius R of the first diffraction ring being at a distance H from the center of diffraction in the medium the substantially spherical parts of which practically have a mean diameter $d_m$, is derived from the equation $$\frac{R}{2H} = 0.82 \frac{\lambda}{d_m}$$

$\lambda$ being the wave length of the monochromatic light used. If one puts $$\frac{R}{H} = \sin {}_R\varphi$$

the equation for the first diffraction ring can be written as follows:

$$\frac{\sin \varphi_R}{2} = 0.82\frac{\lambda}{d_m} = \sin \varphi_1$$

Thus it is seen that the present invention is based on the novel discovery that with a method and a device of the kind described a practically very far reaching independence of the particles to be counted of the size range of the particles is obtained, independently of the wave length of the used light, if the aperture angle of the cone separating the used part from the unused part of the light obtained by diffraction and scattering satisfies the sine condition of the first diffraction ring quoted hereinbefore.

A measuring instrument for carrying out the present invention is characterized by optical means for setting the half-aperture angle of the central cone at an angle having the magnitude $\varphi_1$.

The present invention can be carried out according to the parent application, Serial No. 127,315, filed November 15, 1949, by leaving a central light cone having a half-apertaure angle equal to the angle $\varphi_1$ unused for exciting the measuring cell. On the other hand, different from the embodiment disclosed in the parent application, the portion of the total light which is measured by the measuring cell can be situated within a central light cone having a half-aperture angle of the magnitude $\varphi_1$. The latter contains in this case the light directly passing through the medium and the used portion of the diffracted and scatered light within said conical surface. That this conical surface has a half aperture angle amounting to $\varphi_1$ follows from the fact that the intensity of the light radiated through the medium is equal or at least proportional to the total intensity of the light source. Thus, if a portion of the light cone lying outside a cone having a half-aperture angle $\varphi_1$ has an intensity proportional to the number of particles in the medium, the intensity of the light radiated inside said cone is a measure for the number of particles in the medium which is again independent of the particle size within the predetermined size range. This conclusion is valid under the practically always satisfied assumption that the medium does not appreciably absorb the light.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
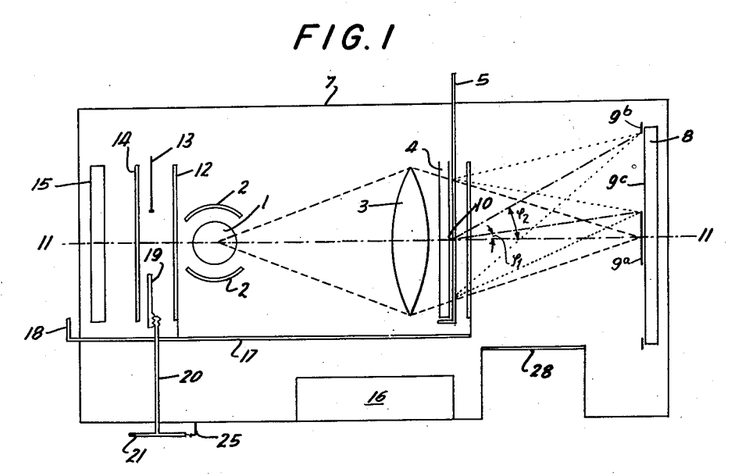
Fig. 1 shows diagrammatically a side elevation of a first embodiment of the present invention.

Referring now to the drawings and first to Fig. 1, a light source or lamp 1 being as point-like as possible is enclosed by part-cylindrical portions 2 of a casing which serve for ventilating the lamp 1. The beam of light emitted by the light source 1 is collected by a lens 3 and passes through a vessel 4 containing the medium such as a liquid in which the particles to be counted such as red or white blood corpuscles are suspended. The vessel 4 is supported within the casing 7 of the measuring instrument by a holder 5 so that the vessel can be pushed into the casing and be exchanged at will. A color filter 6 is arranged in the path of the light rays behind the vessel 4, the color filter 6 being preferably exchangeable.

In the casing 7 near the back end thereof a photoelectric cell 8 is arranged and partly covered by a diaphragm consisting of a central part 9a and a peripheral part 9b permitting the light to impinge on the photoelectric cell 8 in an annular area 9c arranged between the part 9a and 9b. The parts 9a and 9b are preferably adjustable.

The light collected by the lamp 3 and directly passing through the vessel 4 without scattering or diffraction impinges on the central part 9a of the diaphragm. The edge of the part 9a of the diaphragm subtends an angle $2\varphi_1$ at the center 10 of scattering within the vessel 4. Therefore it is seen that the part 9a of the diaphragm defines a cone having an apex coinciding with the center of scattering and a half-aperture angle $\varphi_1$, one arm of which is formed by the optical axis 11—11. The inner edge of the part 9b of the diaphragm defines a similar cone having a half-aperture angle $\varphi_2$. Thus the photoelectric cell 8 measures within the annular area 9c only the intensity of the light scattered and diffracted by the particles in the vessel 4 in directions between the angle $\varphi_1$ and the angle $\varphi_2$. The angle $\varphi_1$ is calculated according to the formulae given hereinabove and depends on the wave length $\lambda$ of the light and the mean cross-sectional area $f_m$ of the particles suspended in the medium in the vessel 4 and amounts with yellow light and red blood corpuscles to 4°. Under the same conditions the angle $\varphi_2$ can be chosen as 30°.

According to a modification of the present invention the outer or peripheral part 9b of the diaphragm can be omitted and the angle $\varphi_2$ can be defined by the dimensions of the photoelectric cell or those of the light sensitive surface thereof. Furthermore, the central part 9a need not be designed as a separate diaphragm but may consist of a simple covering of the photoelectric cell, for instance of a sheet preferably of paper or cardboard cemented to the photoelectric cell. If desired, however, the diaphragm 9a can be entirely omitted if the photoelectric cell 8 is so designed that it is not sensitive to light in the area corresponding to the part 9a or the angle $\varphi_1$, i. e. in this case the light-sensitive area of the photoelectric cell is annular.

Towards the opposite end of the casing 7 the light coming from the source 1 passes through an exchangeable color filter 12, an adjustable diaphragm 13 and through a diffusing ground glass plate 14, and strikes a compensating photoelectric cell 15. Between the ground glass plate 14 and the photoelectric cell 15 an additional diaphragm (not shown) can be provided which is preferably adjustable or exchangeable and serves for readjusting the instrument if one of the photoelectric cells 8 or 15 ages.

All parts of the instrument referred to hereinabove are arranged within the light-proof casing 7 which contains also a galvanometer 16 referred to more in detail hereinafter in connection with Fig. 5. The color filters 6 and 12 are secured to a common holder 17 which extends through a wall of the casing 7 and ends in a handle 18. The holder 17 is rotatably arranged in the casing 7 so that by turning the handle 18 the filters 6 and 12 can be swung out of the path of the light rays and other filters can be brought into position.

The adjustable diaphragm 13 is connected by an adjusting gear 19 to a rod 20 which extends through the bottom of the casing 7 and is connected to a knob 21 serving for adjusting the opening of the diaphragm 13.

Figure 5:
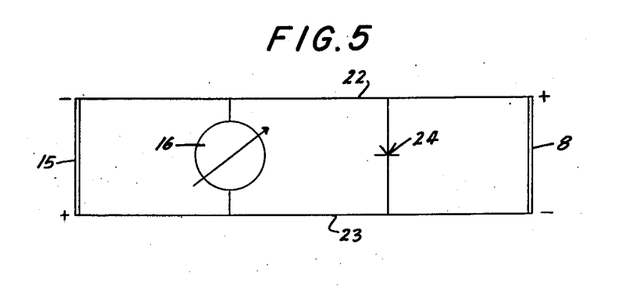
Fig. 5 is a wiring diagram of a compensating connection which can be used with both embodiments according to Figs. 1 and 3.

Referring now to Fig. 5, the photoelectric cell 8 is connected with the positive terminal thereof to a connection 22 whereas the negative terminal of the photoelectric cell is connected to a connection 23. The connections 22, 23 lead to the terminals of the galvanometer 16 and are connected, respectively, to the negative and positive terminals of the compensating photoelectric cell 15. A short-circuiting key 24 is connected between the connections 22 and 23 in shunt with the galvanometer 16.

The operation of the device shown in Figs. 1 and 5 is as follows:

The vessel 4 containing the medium to be examined, for instance blood, is introduced into the casing 7 by means of the holder 5 and the light source 1 is energized. As a rule the galvanometer 16 will indicate under these circumstances a current different from zero. Now the adjustment of the diaphragm 13 is changed by turning the knob 21 until the galvanometer 16 indicates zero current. The position of the knob 21 is read on a scale 25 which is preferably calibrated in numbers of particles per unit volume of the medium.

Figure 2:
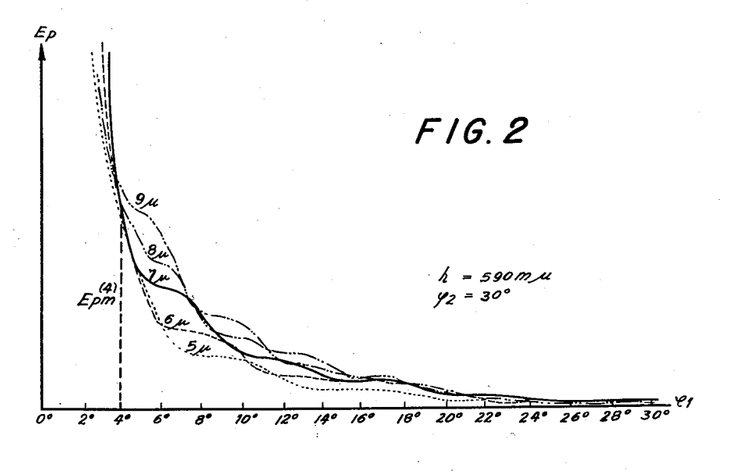
Figs. 2, 2a, 2b, 2c and 2d show diagrams for illustrating the method of operation of a device according to Fig. 1.

Referring now to Fig. 2, a diagram is shown in which the intensities $E_p$ of the light obtained by diffraction and scattering within an annular zone $9c$ between the parts $9a$, $9b$ of a diaphragm according to Fig. 1 are plotted against the angle $\varphi_1$. Thus the ordinates in Fig. 2 are the "peripherical" intensities $E_p$ and the abscissae are the angles $\varphi_1$ formed by the outer edge of the central part $9a$ of the diaphragm with the optical axis 11—11 at the center 10 of the diffraction and scattering situated in the vessel 4. Therefore, $E_p$ is the intensity measured for different apertures of the diaphragm which excites the photoelectric cell 8. The parameter of the various curves shown in Fig. 2 is the diameter of the sphere-like particles given in $\mu$ or thousandths of a mm. The diagram shown in Fig. 2 has been obtained under the assumption that the wave length of the impinging light is 590 m$\mu$ (yellow light) and that the inner edge of the outer part $9b$ of the diaphragm forms with the optical axis 11—11 an angle $\varphi_2=30°$ with respect to the center 10 of diffraction in the vessel 4 so that theoretically no peripheral limitation of the angular range used for the excitation of the photoelectric cell 8 would be given, whereas according to Fig. 1 the said limitation is given by the inner edge of the part $9b$ of the diaphragm, i. e. by a cone concentrical with the optical axis and having a half-aperture angle of $\varphi_2=30°$. The curves shown in Fig. 2 have been obtained according to the formula $$E_p = \int_{\varphi_1}^{\varphi_2} \int_0^{2\pi} dE = E_o N r^2 2\pi \int_{\varphi_1}^{\varphi_2} \left[ J_1\left(\frac{2\pi r}{\lambda} \sin \varphi\right) \right]^2 \frac{d\varphi}{\sin \varphi}$$

wherein the letters have the following meaning:

$E_o$ = intensity of the total light impinging on the liquid in the vessel
$N$ = number of particles impinged by the light per unit area of the impinged section of the vessel
$r$ = radius of particles = $d/2$
$J_1(x)$ = Bessel function of the first kind
$\lambda$ = wave length of the impinging light
$\varphi$ = angle included with the optical axis at the center 10 of diffraction There is no noticeable difference, if $\varphi_2=30°$ is chosen instead of infinite. Within the limits of accuracy of the measurements according to Fig. 1, Fig. 2 may be regarded as the intensity of the light falling within the ringshaped range $9c$ of the photoelectric cell 8 between the diaphragm parts $9a$ and $9b$ in a device according to Fig. 1, if the diameter of the diaphragm part $9a$ is variable and thus angle $\varphi_1$ is variable, since according to Fig. 1 $\varphi_2=30°$ too. As unit of intensity on the ordinate the intensity of the impinging light $E_o$ is used as stated the scale of ordinates being calculated by assuming that in the integral-formula for $E_p$ the number of particles per cm.$^2$ of the section of the vessel impinged by the light stays equal to $N=1,000,000$ per cm.$^2$ If one is using cuvets or vessels as usual with 5 mm. depth of the layer of the medium to be tested, there results a concentration of the particles $c=2,000,000$ particles per cm.$^3$. Thus, all curves of Fig. 2 apply for one and the same concentration of particles $c$.

Therefore it is seen from Fig. 2 that the intensity of $E_p$ depends for yellow light on the angle $\varphi_1$ or on the equivalent radius of the part $9a$ of the diaphragm. Five curves are shown corresponding to particle diameters of $5\mu$ to $9\mu$. In the range of $\varphi_1=4°$ the curves are bundled at the dashed ordinate $E_{pm}{}^{(4)}$, that is they partly cross and partly converge in the end point of this ordinate. The bundling means that if angle range used for measuring of the intensity is limited to a range beyond 4°, the measured intensity in a range of $5\mu$ to $9\mu$ is nearly independent from the particle size and depends only on the concentration of the particles. If the particles are not distributed too densely in the medium the light intensity measured with the photoelectric cell 12 is proportional to the number of particles in the medium.

Figures 2A, 2C:
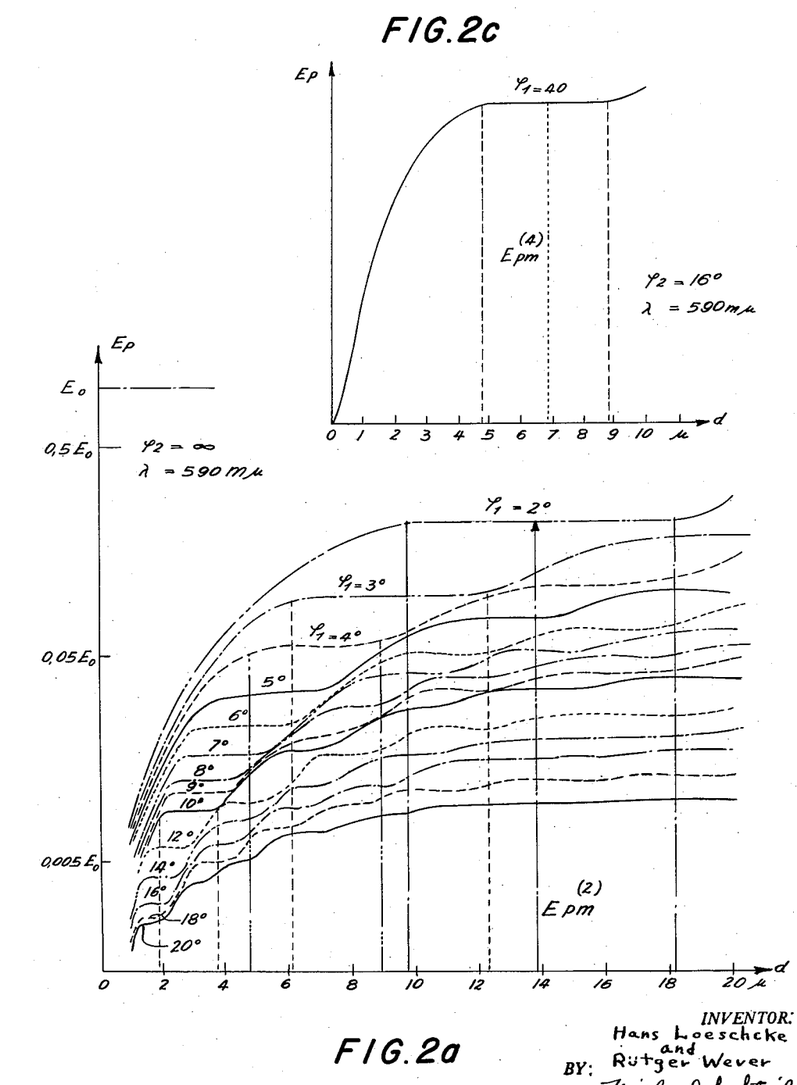

Fig. 2a shows a diagram corresponding to Fig. 2, but in larger scale. Here $E_p$ (as ordinate) is plotted against the particle size $d$ as variable (abscissa), $\varphi_1$ being the parameter of the curves with $\varphi_2=\infty$. The scale uses $E_0$ as unit of the ordinate and is logarithmically divided. Each curve shows after the first ascending part a nearly horizontal course within a range of particle sizes given in following table, e. g. for $\varphi_2=2°$ in the range from $d=9.4\mu$ to $18\mu$ for $E_p$ a constant value $E_{pm}{}^{(2)}$.

Table I

| Cone-angle, $\varphi_1$ | Particle sizes, $d_m$ in $\mu$ | | Mean $d_m$ of the ranges |
|---|---|---|---|
| | lower limit | upper limit | |
| 2° | 9.4 | 18.2 | 13.8$\mu$ |
| 3° | 6.1 | 12.3 | 9.2$\mu$ |
| 4° | 4.9 | 8.9 | 6.9$\mu$ |
| 5° | 3.8 | 7.2 | 5.5$\mu$ |
| 6° | 3.0 | 6.2 | 4.6$\mu$ |
| 7° | 2.6 | 5.2 | 3.9$\mu$ |
| 8° | 2.02 | 4.8 | 3.5$\mu$ |
| 9° | 2.0 | 4.2 | 3.1$\mu$ |
| 10° | 1.8 | 3.8 | 2.8$\mu$ |
| 11° | 1.65 | 3.45 | 2.55$\mu$ |
| 12° | 1.53 | 3.03 | 2.33$\mu$ |
| 13° | 1.40 | 2.90 | 2.15$\mu$ |
| 14° | 1.30 | 2.70 | 2.00$\mu$ |
| 15° | 1.22 | 2.52 | 1.87$\mu$ |
| 16° | 1.14 | 2.38 | 1.76$\mu$ |
| 17° | 1.06 | 2.24 | 1.65$\mu$ |
| 18° | 1.02 | 2.12 | 1.57$\mu$ |
| 19° | 0.97 | 2.01 | 1.49$\mu$ |
| 20° | 0.92 | 1.92 | 1.42$\mu$ |

Based on the preceding table it can be shown that the formula $$\sin \varphi_1 = 0.82 \frac{\lambda}{d_m}$$

is valid whereby $\lambda=590$ m$\mu$, i. e. the angles specified in column 1 of the table are calculated by using the values specified in the last column in this formula. Simultaneously the table shows the formula is always exactly valid in a range of $\pm 35\%$ of the value of $d_m$, since the given lower and upper limits of the horizontal parts of the curves differ from the mean value $d_m$ for about 35%. The formula also is valid for a given $d_m$ independently from the particle size if the real particle size does not differ more than 35% from the chosen mean value. Since as a rule in a sample the particle sizes are not all of a size within the specified $\pm 35\%$ range but are of different sizes within this range, the formula is also valid with good approximation practically in a much wider range below and above the supposed mean value $d_m$.

If the wave length of the light impinging on the medium to be tested would be varied there would result in Fig. 2a for the angles specified in the preceding table a whole lot of curves quite analogous to those represented in Fig. 2a, whereby however the ranges of particle sizes corresponding to the preceding table in which the curves have a nearly horizontal course after a first ascending part are placed differently, i. e. in such a manner that the mean $d_m$ of these ranges is as much larger as the wave length is larger and vice versa.

Figure 2B:
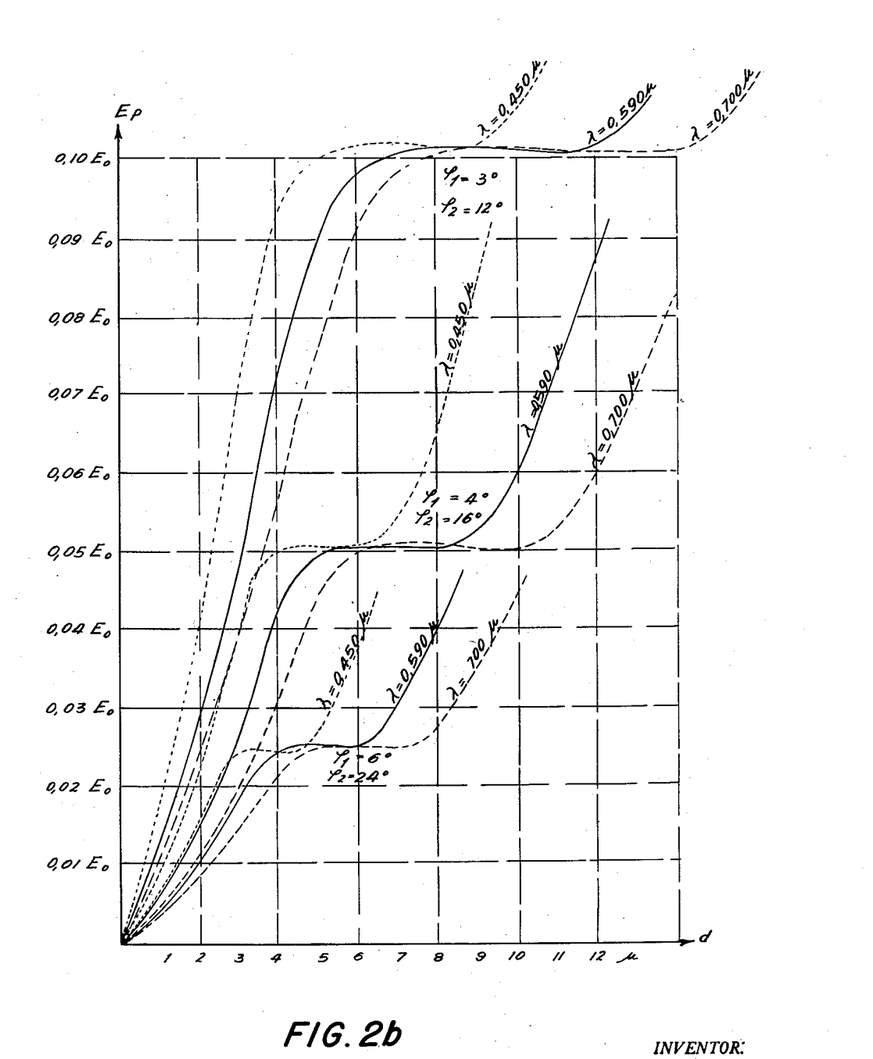

The diagram according to Fig. 2b proves the accuracy of this relation between the intensity and the wave length. Fig. 2b represents a diagram showing the relations between the intensity $E_p$ and the size of the particles and the wave length which is used as parameter for three groups of curves consisting of three curves each. The top curve has a range of angle of $\varphi_1=3°$ and $\varphi_2=12°$, the middle curve has a range of angle of $\varphi_1=4°$ and $\varphi_2=16°$, and the lower curve has a range of angle of $\varphi_1=6°$ and $\varphi_2=24°$. A unit of the linear scale of the ordinates $E_0$ was chosen as in Fig. 2. For each one of the curves the parameter of which is the wave length there exists a horizontal range, where the intensity $E_p$ is independent of the particle size $d$. For the middle curve of each group of curves (consisting of three curves each) which is valid for the wave length 590 m$\mu$, the range of constant intensity is practically the same as in Table I. By comparing with the adjoining curves may be read that the angle $\varphi_1$ or more exactly $\sin \varphi_1$ for the mean value $d_m$ of the horizontal ranges is proportional to the wave length. The upper limit $\varphi_2$ here is important for intensity only. As far as $\varphi_2$ should be wide compared with $\varphi_1$ and therefore it was chosen four times as wide as $\varphi_1$. The results then are practically the same as if $\varphi_2$ was chosen infinite. In order not to make the drawing too difficult to survey there are only three different wave lengths and three different sizes of $\varphi_1$ taken out of Fig. 2b. The drawing easily could be completed and would then represent the proportionality between $\varphi_1$ and $\lambda$ shown in the following table:

Table II

| Wave length $\lambda$ in m$\mu$ | Angle of cone $\phi_1$ | |
|---|---|---|
| | mean value, $d_m=7.5\mu$ | mean value, $d_m=15\mu$ |
| 400 | 2° 30′ | 1° 15′ |
| 500 | 3° 8′ | 1° 34′ |
| 590 | 3° 42′ | 1° 51′ |
| 600 | 3° 46′ | 1° 53′ |
| 700 | 4° 23′ | 2° 12′ |
| 800 | 5° 1′ | 2° 31′ |

The middle column shows for a range of particle sizes from 5$\mu$ to 9$\mu$ with the means value 7.5$\mu$, in which the intensity curves have a horizontal course, the growing of the angle $\varphi_1$, to which the measuring device has to be adjusted in order to get this independence of the particle size in this range. The same is valid for the right column for a range of particle sizes between 10$\mu$ and 20$\mu$ with a mean value $d_m=15\mu$. In both cases results a practically complete proportionality of the increase of $\varphi_1$ to the increase of the wave length. This proportionality would be quite exact if instead of $\varphi_1$ the value $\sin \varphi_1$ would be listed in the table. Quite the same result is obtained for other values of $d_m$ within the total range from 1$\mu$ to 20$\mu$.

Besides the horizontal ranges following the first ascending part of the curves Fig. 2a shows other horizontal ranges following a further ascending of the curves for $\varphi_1<2°$ and which ranges are occurring repeatedly for larger $E_p$ the more $d$ is growing. This frequent occurring of these horizontal ranges is preferably to be seen for angles wider than 4°; it also would result for smaller angles, if the diagram of Fig. 2a would be continued to the right for larger particle sizes.

Therefrom results that the measuring device may also be used for wider ranges of $d_m$ corresponding to the formula $$\sin \varphi_1 = 0.82 \frac{\lambda}{d_m}$$

that is always for those ranges in which the curve according to Fig. 2a has a horizontal course for the angle to which the measuring device is adjusted. With other words a measuring device adjusted and calibrated to a certain angle with the aid of the above formula can be used except for the range of $d_m \pm 35\%$ also for the range of bigger particles with a mean thickness $d_m' > d_m$, for which the curve of the intensity $E_p$ to be measured has a practically horizontal course; since also for this case this curve depends for the given wave length of the measuring device only on the particle size $d$. If it is wanted to use the measuring device adjusted and calibrated to $\varphi_1$ for ranges of higher classes corresponding to these $d_m'$, it is only necessary to calibrate the scale of the measuring device corresponding to that horizontal part of the curve which belongs to the range of $d_m'$ on which the measuring is based.

In Fig. 2a e. g. for $\varphi_1=4°$ is the constant range for $E_p$ of the first order between 4.9$\mu$ and 8$\mu$, however the constant range for $E_p$ of the second order between $d=12\mu$ and 18$\mu$ so that $d_m'=15\mu$. However, since with regard to the logarithmic scale the intensity of the constant range ($d_m$) of the first order for a curve with a certain $\varphi_1$ decreases very much to ⅓ to ¼ to the constant range ($d_m'$) of the second order lying below the first constant range and corresponding to another curve with another $\varphi_1$, for which becomes $d_m'=d_m$, it is advisable to prefer the application of the formula $$\sin \varphi_1 = 0.82 \frac{\lambda}{d_m}$$

for the range of the first order.

Fig. 2a theoretically is valid only for the case that $\varphi_2$ is infinite in the measuring device, but it already has been shown that this results in no difference within the limits of measuring accuracy, if $\varphi_2$ is chosen 30° instead of infinite, i. e. wide compared to $\varphi_1$. Indeed the nearly horizontal ranges of the first order of the curves of Fig. 2a show an exactly horizontal course if $\varphi_2$ is still wide compared to $\varphi_1$, but is chosen essentially smaller than 30°, i. e. 16°, and the intensity measuring of the measuring device is adjusted to this case. That means that in the device according to Fig. 1 the outer diaphragm 9b is limiting the defracted light to an angle of $\varphi_2=16°$ only.

The proof of this result of the research of the inventors is given by Fig. 2c which as an example only represents the left part of the curve of the diagram Fig. 2a for $\varphi_1=4°$ where, however, $\varphi_2$ is chosen 16°. The curve according to Fig. 2c differs from the corresponding curve of Fig. 2a practically only in the manner that it is exactly horizontal in the range from 4.9$\mu$ to 8.9$\mu$. It must be emphasized that the curve for 4° here is used as example for any angle $\varphi_1$ because of clearness, and that the same regularity as for $\varphi_1=4°$ is resulting too for the other curves of Fig. 2a, if $\varphi_2=16°$ or chosen between 16° and 30°. With other words, there results an improvement of the measuring accuracy if the deflected light in a peripheric range outside of the cone angle $\varphi_2$ is not measured, but suppressed by a diaphragm.

Figure 2D:
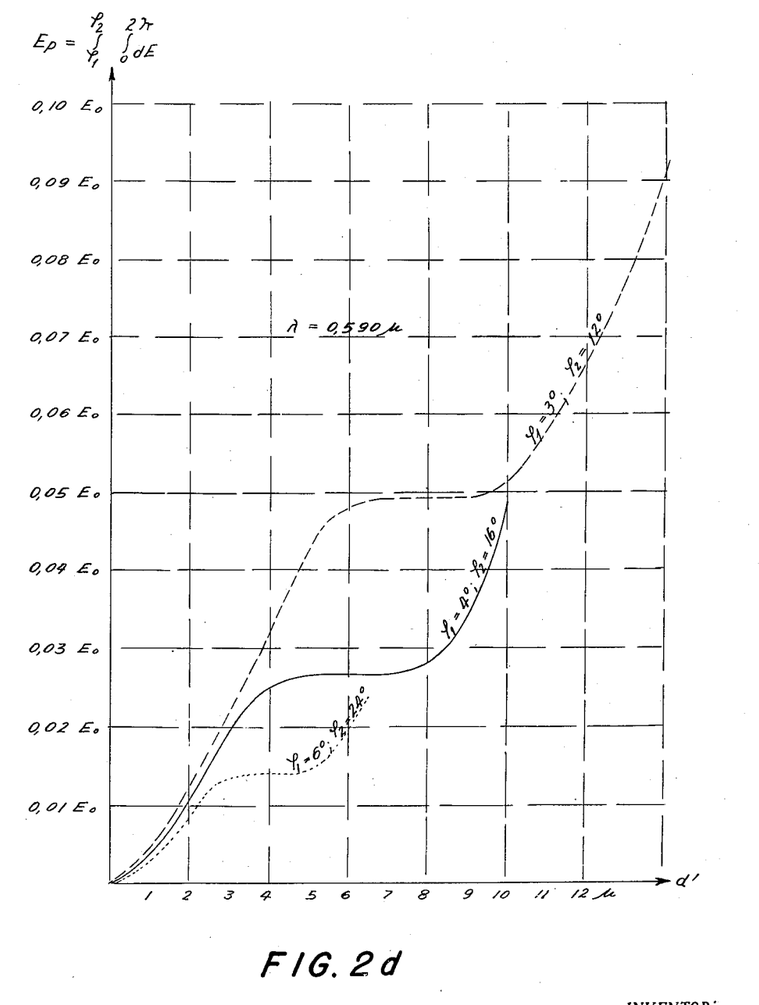

The statements based on Figs. 2, 2a, 2b and 2c and the respective tables with the formulas are valid with good accuracy for nearly spherical particles only, but the measuring accuracy would decrease if the particles have a length relatively great compared to their thickness, e. g. if the particles—e. g. bacteria—are approximately cylindrical rods with a diameter $d'$ and a length being about twice as long as their thickness $d'$—or if the particles have an elliptical cross section where the length of the short axis of the ellipsis is $d'$ and the long axis of the ellipsis is about 2'. For this case e. g. the formula for sin $\varphi_1$ has to be corrected accordingly, as is derived from Fig. 2d as follows:

Fig. 2d shows in a linear scale as in Fig. 2a and for $\lambda=590$ m$\mu$ with $E_o$ as unit for the ordinate the dependency of intensity $E_p$ on the size of particles referring at the time to a curve of intensities pertaining to a range of $\varphi_1=6°$ up to $\varphi_2=24°$ or to a range of $\varphi_1=4°$ to $\varphi_2=16°$ respectively, or to a range of $\varphi_1=3°$ up to $\varphi_2=12°$ respectively. Again the curves show horizontal ranges where the intensity is independent from the thickness of the elongated particles. The same regularity would apply to other ranges of angles, i. e. quite similarly to Fig. 2a for other angles $\varphi_1$, if $\varphi_2$ is chosen wide compared with $\varphi_1$. In order to make the drawing easy to survey the curves for these cases have been omitted. Altogether the already mentioned relations for elongated and elliptically shaped particles $$\sin \varphi_1 = 0.71 \frac{\lambda}{d^e_m}$$

can be derived from the curves.

If a diagram similar to Fig. 2 would be drawn for the sizes of 5$\mu$ to 10$\mu$, again a bundling of curves would appear, but this time at a wave length of 590 m$\mu$ not within a range of 4°, but merely 3½°. Hence it becomes clear that also for elongated particles always a range can be determined where measurements are practically independent on the size and thickness of particles, thus allowing and adjusting and gauging for these ranges with a conic angle $\varphi_1$. The sole difference compared with spherical particles consists in the fact that $d_m^e$ over a range of $\pm 25\%$ is not to be determined by the diameter but by the thickness of particles.

Fig. 2d pertains to the wave length 590 m$\mu$. Its conformity or the constant ranges respectively can be plotted according to Fig. 2b for other wave lengths too, where also for elongated particles a proportionality of $\varphi_1$ to $\lambda$ can be derived according to the already above mentioned formula with rather fair approximation. Proof is given in the following table that the conic angle $\varphi_1$ is dependent on the wave length $\lambda$, where the given and with $d_m^e$ designed ranges of particles apply to a range of $d_m^e \pm 25\%$ and where the curves of intensity practically take a horizontal course.

*Table III*

(Elongated particles)

| Wave Length $\lambda$ in m$\mu$ | Angle of Cone $\phi_1$ | | |
|---|---|---|---|
| | Mean value, $d^e_m=2\mu$ | Mean value, $d^e_m=6\mu$ | Mean value, $d^e_m=10\mu$ |
| 200 | 4° 4' | 1° 21' | 0° 49' |
| 300 | 6° 7' | 2° 2' | 1° 13' |
| 400 | 8° 10' | 2° 43' | 1° 37' |
| 500 | 10° 13' | 3° 24' | 2° 2' |
| 600 | 12° 17' | 4° 4' | 2° 27' |
| 700 | 14° 22' | 4° 45' | 2° 51' |

Figure 3:
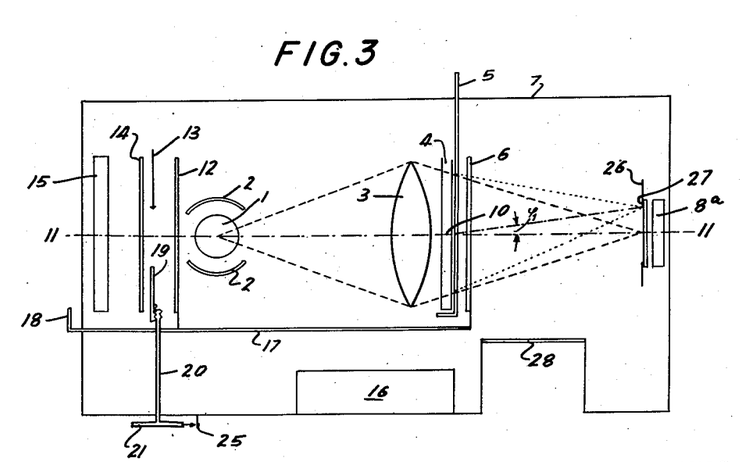
Fig. 3 is a side elevation of a second embodiment of the present invention.

Referring now to Fig. 3, showing another embodiment of the present invention, the instrument corresponds in the parts referred to by the same reference numerals as in Fig. 1 to the same, and also the diagram according to Fig. 5 is applicable to the embodiment according to Fig. 3. The whole difference of the embodiment according to Fig. 3 from that shown in Fig. 1 consists in that only the light cone defined by the angle $\varphi_1$ is utilized for the measurement, i. e. the intensity of the light directly passing through the medium in the vessel 4 and of the scattered and diffracted light falling within the cone having a half-aperture angle $\varphi_1$ is measured by means of a photoelectric cell 8a which is exposed to the light cone having a half-aperture angle $\varphi_1$. According to the embodiment shown in Fig. 3, the angle $\varphi_1$ is determined by a preferably adjustable apertured diaphragm 26 the circular inner edge of which forms relatively to the optical axis 11—11 at the center 10 of diffraction the angle $\varphi_1$. The angle $\varphi_1$ has to be calculated exactly according to the same formulae as in the embodiment shown in Fig. 1 which have been discussed hereinabove, and depends on the wave length of the monochromatic impinging light and the mean size of the particles. In order to obtain a uniform distribution of the light on the photoelectric cell 8a a diffusing ground glass plate 27 is inserted between the photoelectric cell 8a and the apertured diaphragm 26.

Obviously the diaphragm 26 can be altogether omitted provided that the magnitude of the angular range used for measuring the intensity and defining the angle $\varphi_1$ is given by the magnitude of the diameter of the light-sensitive range of the photoelectric cell or that any light-sensitive portions of the photoelectric cells which are arranged outside this angular range $\varphi_1$ are screened. For screening purposes for instance a cardboard or paper sheet may be cemented to the front side of the photoelectric cell 8a, said sheet having an aperture defining the angle $\varphi_1$. The scale 25 is calibrated in the embodiment shown in Fig. 3 so that at the zero position of galvanometer 16 the number of particles can be immediately read from the scale. Thus the calibration of the scale 25 is different from that of the scale 25 in Fig. 1 because in the latter embodiment the number of particles is directly proportional to the measured light intensity whereas in the embodiment according to Fig. 3 it is proportional to the decrease of the impinged light intensity ($E_o$).

This is seen from the following consideration:

According to the above-mentioned formula for the embodiment shown in Fig. 1, the following expression holds for the light intensity $$E_p = \int_{\varphi_1}^{\varphi_2} \int_0^{2\pi} dE = E_o N r^2 2\pi \int_{\varphi_1}^{\varphi_2} \left[ J_1\left(\frac{2\pi r}{\lambda} \sin \varphi\right) \right]^2 \frac{d\varphi}{\sin \varphi}$$

As the intensity drops very much towards the outside the integral can be taken between the limits $\varphi_1$ and $\infty$; i. e. $E_p$ is practically the intensity of the total light being outside the cone having a half-aperture angle $\varphi_1$. The total intensity of the light impinging on the plane of the photoelectric cell consisting of the directly impinging light and the diffracted light has to be equal to the intensity $E_o$ of the light impinging on the medium in the vessel 4 because practically no light is lost by absorption. Therefore, the intensity $E_c$ of the "central" light contained in a cone having a half-aperture angle $\varphi_1$ is given by the formula $$E_c = E_o - E_p = E_o - E_o N r^2 2\pi \int_{\varphi_1}^{\varphi_2} \left[ J_1\left(\frac{2\pi r}{\lambda} \sin \varphi\right) \right]^2 \frac{d\varphi}{\sin \varphi}$$

From this expression it is seen that also $E_c$ depends only on the number N of the particles and can be used as a quantity indicating the same just as well as $E_p$. However, $E_c$ is not directly proportional to the increase of the number of particles but to the decrease $E_o$. It should be noted that the total intensity in the plane of the photoelectric cell is constant and equal to $E_o$.

Figure 3A:
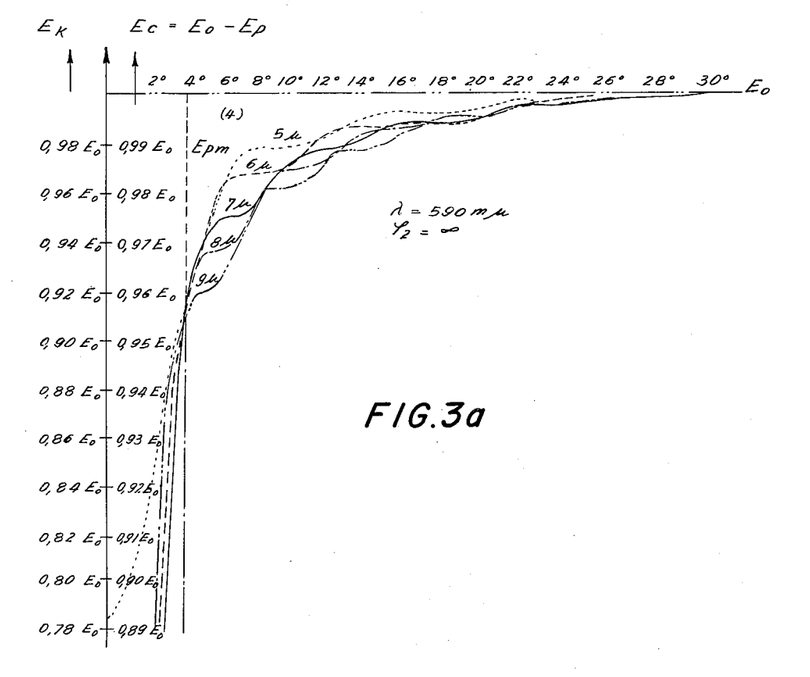
Fig. 3a shows a diagram for illustrating the method of operation of a device according to Fig. 3.

Fig. 3a explains the procedure for measurements with the device of Fig. 3 in the same way as it does Fig. 2a for device 1. Fig. 3a shows in the ordinate for yellow light of the wave length $\lambda=590$ m$\mu$ the intensity of the deflected and scattered light which integrated according to the equation for $E_c$, falls into the central range within the conic angle with the half angle of aperture $\varphi_1$ (see Fig. 3), if the upper limit of integration $\varphi_2=30°$ is chosen. As in Fig. 2a or 2c respectively no remarkable difference occurs, if for the integration $\varphi_2=30°$ or less is chosen instead of infinite. Within the limit of accuracy of measurements according to Fig. 3 also Fig. 3a can be taken as the intensity of the light falling into the concentric range of the opening of the diaphragm 26 into the photoelectric cell 8a, if the diameter of diaphragm 26 is variable thus making variable the angle $\varphi_1$. The parameter of the curves of Fig. 3a is the size of particles $d$ measured in $\mu$. As unit for the scale of the ordinate again $E_o$ has been chosen. The scale on the right side of the perpendicular axis of the diagram shows the value of $E_c$, while the scale to the left of it belongs to the embodiment as in Figs. 6 and 7 where it is discussed. The scale of the ordinate does not start with $E_c=0$, but with $E_c=0.89\ E_o$, due to lack of space. The curves of Fig. 3a can be derived from Fig. 2—with regard to the scale—drawing a line in Fig. 2 near the horizontal O-axis parallel to it. Here $E_p$ becomes 0 for $\varphi_1=30°$. If the curves of Fig. 2 are turned down mirrorlike, Fig. 3a originates. The small distance between this horizontal line and the axis of the abscissa of Fig. 2, originating from the difference of the limit of integration $\varphi_2=30°$ (Fig. 3a) and $\varphi_2=\infty$ (Fig. 2) can be neglected too. Therefore it can be stated with sufficient approximation that the values $E_c$ of Fig. 3a can be derived from Fig. 2, if in each point of the curve $E_c=E_o-E_p$ is formed, according to the line drawn for $E_o$ in Fig. 2. According to Fig. 3 the same grouping of the group of curves occurs an an angle $\varphi_1=4°$, the ordinate of which $E_{pm}^{(4)}$ is put down in Fig. 2, where $E_{cm}^{(4)}$ is practically $=E_o-E_{pm}^{(4)}$ as in Fig. 3a.

Hereafter a diagram quite similar to Fig. 2a could be plotted for $E_c$. And again with each curve, i. e. at each angle $\varphi_1$, several ranges would be received, where the curves are practically horizontal and for which with a suitable gauge measurements might be carried out independently from the size of particles, especially within the first horizontal range (1 class). A special representation of this diagram did not seem necessary due to the clear relation between the Figs. 2, 2a and 3a. For the first horizontal range of the curves with $\varphi_1$ as parameter as well as for the procedure of measuring according to Fig. 3 holds the equation $$\sin \varphi_1=0.82\frac{\lambda}{d_m}$$

for spherical particles: exactly for the ranges $d_m \pm 35\%$, and $$\sin \varphi_1=0.71\frac{\lambda}{d_m^e}$$

for elongated particles with the mean thickness $d_m^e$ with fair approximation within the ranges of $d_m^e \pm 25\%$.

Therefore the other statements referring to Figs. 2a, 2b, 2c, 2d are also valid for Fig. 3a.

Figure 4:
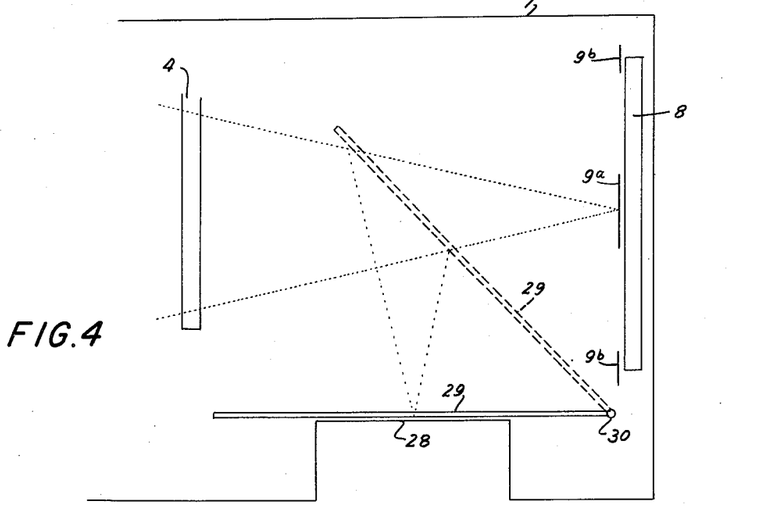
Fig. 4 shows on an enlarged scale a detail usable with both embodiments according to Figs. 1 and 3.

In the front part of the casing 7 i. e. in the righthand part thereof a ground glass plate 28 is arranged in both embodiments according to Figs. 1 and 3 on which a diffraction pattern can be formed by means of a device shown in Fig. 4 showing only the right-hand part of the casing 7 on an enlarged scale. The diffraction pattern is used for instance in order to determine the size of the suspended particles from the first diffraction ring. A plane mirror 29 is hinged about a hinge 30 arranged substantially in the plane of the ground glass plate 28 so that the mirror 29 has the position shown in full lines when the number of the particles is to be determined, the mirror 29 lying on the ground glass plate 28 during this operation. In order to form the diffraction pattern on the ground glass plate 28, the mirror 29 is turned about the hinge 30 into the position shown in dotted lines in which the mirror is secured by suitable means (not shown). The beam of light passing through the vessel 4 is reflected by the mirror 29 towards the ground glass plate 28 so that the diffraction pattern is formed on the same. During this operation preferably the color filter 6 is moved out of the path of the light rays by means of the holder 17 and handle 18. In the diagrammatic representation of Fig. 4 a photoelectric cell 8 and a diaphragm 9a, 9b are shown; it should, however, be understood that these parts could be replaced by the photoelectric cell 8a and the diaphragm 26 according to Fig. 3. The remaining parts of the measuring instruments arranged in the left-hand portion thereof are omitted in Fig. 4 for the sake of simplicity.

Figure 6:
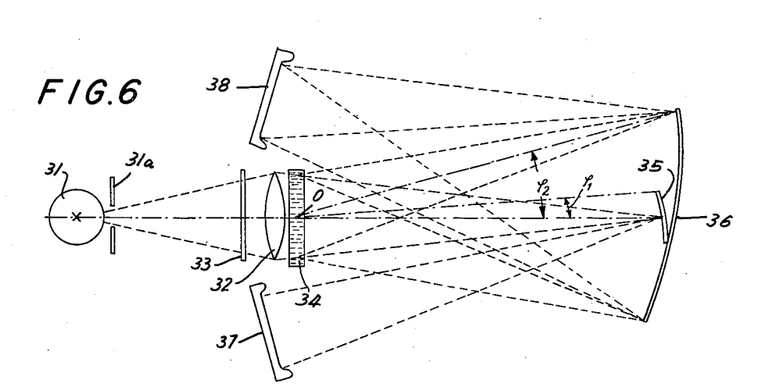
Fig. 6 is a view of part of a third embodiment of the present invention which is suitable for a high-sensitive and easily portable instrument of small dimensions.

Referring now to Fig. 6, the light is emitted by a light source 31 being as point-like as possible and passes through a circular opening of a diaphragm 31a and through a color filter 33 which renders the light as monochromatic as possible. After passing the color filter 33 the light is collected by a lens 32 and enters the vessel 34 which contains the particles to be counted suspended in a medium (liquid). An image of the light source 31 is formed by the lens 32 in the plane of two concave mirrors 35 and 36. The concave mirror 35 is exposed to the light cone coaxial with the optical axis and having a half-aperture angle $\varphi_1$ having its apex at the center O of diffraction in the middle of the vessel 34. In consequence thereof, an image of the diffracting particles contained in the vessel 34 is formed at a place in which a photoelectric cell 37 is arranged. It should be noted that the light the intensity of which is measured by the photoelectric cell 37 contains light passing unscattered and undiffracted through the vessel 34 and also light which is diffracted by the particles under an angle smaller than $\varphi_1$.

The concave mirror 36 forms an image of the vessel 34 at the place of another photoelectric cell 38 receiving all those light rays which are diffracted from the diffracting center O under angles between $\varphi_1$ and $\varphi_2$ with respect to the optical axis.

The optical axes of the two systems of concave mirrors 35 and 36 which have preferably equal focal lengths are inclined against each other. In the embodiment shown in Fig. 6, the concave mirrors form each an image in the ratio of substantially 1:1 so that the two photoelectric cells i. e. the measuring cell 37 proper and the compensating cell 38 are as large as the area of the vessel 34 impinged by the light.

The measuring photoelectric cell 37 measures the intensity $E_c$ according to Fig. 3a. The compensating photoelectric cell 38 measures the intensity $E_p$ according to Fig. 2a, where in each point $E_c=E_o-E_p$; $E_o$ representing the complete intensity, emitted by the source of light 31. If one chooses the compensating connection in such a way that the intensity measured by the photoelectric cell 38 is deducted from that of the photoelectric cell 37 the compensating device then measures an intensity $E_k=E_o-2E_p$. Therefore Fig. 3a represents $E_k$ for $\lambda=590$ m$\mu$ with $E_o$ as unit, if the double scale for $E_k$ written on the left and beginning with 0.78 $E_o$ is read instead of the scale of the ordinate for $E_c$ as written on the right. Hence it follows that the laws derived and described for Figs. 2, 2a, 2b, 2c, 3a hold also for the device as in Figs. 6 and 7 with the only difference that its sensibility has been doubled. The essentials of the compensating arrangement are in Figs. 6 and 7 as follows.

Figure 7:
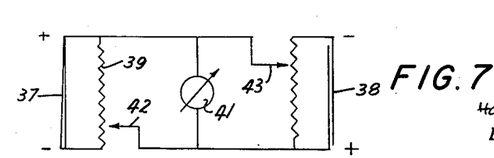
Fig. 7 is a wiring diagram of a compensating connection used in connection with the instrument shown in Fig. 4.

The two photoelectric cells 37 and 38 are connected according to Fig. 7 in parallel with potentiometers 39 and 40, respectively, from which portions of the voltages generated by the photoelectric cell are tapped by means of adjustable contacts 42 and 43, respectively, these portions being independent of the brightness of the lamp 31. The portions of the voltages are fed in opposition to each other to a galvanometer 41. One of the potentiometers, preferably the potentiometer 39 connected in shunt with the photoelectric cell 37 acted upon by the inner light cone serves for the measuring proper and carries a scale directly calibrated in concentrations of particles, whereas the other potentiometer can be used for adjustments of this instrument after changes due to aging or the like, of the photoelectric cells. In order to carry out the measurements the contact 42 cooperating with the potentiometer 39 is brought in a position which renders the galvanometer 41 currentless. The ratio of the voltages supplied by the two photoelectric cells or of the light intensity impinging on the same is directly a measure for the concentration of the diffracted particles i. e. for their number in unit volume.

As in the parent application Serial No. 127,315, filed November 15, 1949, the measuring instrument is so equipped that also colorimetric determinations of the hemoglobin content can be made. To this purpose one of the two photoelectric cells can be disconnected or connected in parallel with the other so that the two photoelectric cells are connected to one and the same potentiometer. For the measurement the measuring potentiometer is so adjusted that the galvanometer indicates in the rest position thereof a division different from the zero division; thus the potentiometer taps a constant voltage being a variable fraction of the voltage of the photoelectric cell which depends on the absorption by the hemoglobin. The position of the tap of the potentiometer on a specially calibrated scale indicates the absorption of the hemoglobin content. In this case the color filter 33 is exchanged against a diffusing ground glass plate and a regulating diaphragm which was originally connected to the color filter 33 can be used for adjusting the absorption measurements.

It should be noted that instead of the optical elements 35 and 36 adjusted for blood examinations at predetermined angular quantities $\varphi_1$ and $\varphi_2$, other optical elements could be used which have different dimensions or are adjustable with respect to the angular range in order to adjust the measurement to a predetermined size range of particles.

It will be understood that each of the elements described above, or two or more together, may also find a useful application in other types of methods for counting the number of microscopic particles suspended in a medium differing from the types described above.

While the invention has been illustrated and described as embodied in a device for counting the number of microscopic particles suspended in a liquid, it is not intended to be limited to the details shown, since various modifications and structural changes may be made without departing in any way from the spirit of the present invention as presented in the appended claims.

What is claimed as new and desired to be secured by Letters Patent is:

1. Apparatus for determining the number of microscopic particles, within a given range of sizes, suspended in a translucent medium, comprising, in combination, optical means, including a source of light of a predetermined wave length, for directing a beam of said light along the optical axis of said optical means; support means for supporting a quantity of the translucent medium, with microscopic particles within said range of sizes suspended therein, at a predetermined point along said optical axis in the path of said beam of light so that the latter passes through said medium and is partly diffracted by the particles suspended in the medium; a member arranged on said optical axis on the opposite side of said support means from said source of light in the path of said light beam emerging from a quantity of the translucent medium carried by said support means, having a circular edge whose center is in said optical axis, said last-mentioned member being located from said support means at an optic axis distance which forms with a straight line extending from said predetermined point to a point on said circular edge an angle within and outside of which the intensity of said light beam is independent of the size of the particles within said given range of sizes while being dependent on the quantity of the particles, whereby an inner portion of the light emerging from a quantity of translucent medium carried by said support means is surrounded by said circular edge and an outer portion of light surrounds said inner portion of light; and photoelectric means for measuring the intensity of at least one of said portions of light, whereby the thus measured light intensity is capable of directly indicating the number of particles within said given range of sizes suspended in the translucent medium.

2. Apparatus for determining the number of microscopic particles, within a given range of sizes, suspended in a translucent medium, comprising, in combination, optical means, including a source of light of a predetermined wave length, for directing a medium of said light along the optical axis of said optical means; support means for supporting a quantity of the translucent medium, with microscopic particles within said range of sizes suspended therein, at a predetermined point along said optical axis in the path of said beam of light so that the latter passes through said medium and is partly diffracted by the particles suspended in the medium; an opaque circular member arranged on said optical axis on the opposite side of said support means from said source of light in the path of said light beam emerging from a quantity of the translucent medium carried by said support means, having a circular edge whose center is in said optical axis, and being located from said support means at an optic axis distance which forms with a straight line extending from said predetermined point to a point on said circular edge an angle within and outside of which the intensity of said light beam is independent of the size of the particles within said given range of sizes while being dependent on the quantity of the particles, whereby an inner portion of light emerging from a quantity of translucent medium carried by said support means falls on said opaque member and an outer portion of light surrounds said inner portion of light; and photoelectric means located on said optical axis closely adjacent to said opaque member on the side thereof opposite from said support means and extending radially beyond said circular edge of said opaque member so that said outer portion of light falls on said photoelectric means, whereby the intensity of said outer portion of light may be measured with said photoelectric means to directly indicate the number of particles within said given range of sizes suspended in the translucent medium.

3. Apparatus for determining the number of microscopic particles, within a given range of sizes, suspended in a translucent medium, comprising, in combination, optical means, including a source of light of a predetermined wave length, for directing a beam of said light along the optical axis of said optical means; support means for supporting a quantity of the translucent medium, with microscopic particles within said range of sizes suspended therein, at a predetermined point along said optical axis in the path of said beam of light so that the latter passes through said medium and is partly diffracted by the particles suspended in the medium; a member arranged on said optical axis on the opposite side of said support means from said source of light in the path of said light beam emerging from a quantity of the translucent medium carried by said support means, having a circular edge whose center is in said optical axis, said last mentioned member being located from said support means at an optic axis distance which forms with a straight line extending from said predetermined point to a point on said circular edge, an angle within and outside of which the intensity of said light beam is independent of the size of the particles within said given range of sizes while being dependent on the quantity of the particles, whereby an inner portion of the light emerging from a quantity of translucent medium carried by said support means is surrounded by said circular edge and an outer portion of light surrounds said inner portion of light; first photoelectric means for measuring the intensity of at least one of said portions of light; second, compensating photoelectric means arranged on said optical axis on the opposite side of said light source from said first photoelectric means and being electrically connected to said first photoelectric means; a zero indicating instrument electrically connected to and between said first and second photoelectric means; an adjustable diaphragm arranged on said optical axis between said light source and said second photoelectric means; and manually operable means for adjusting the aperture of said diaphragm to a size where said zero indicating means indicates zero, so that the position of said diaphragm operating means will then directly indicate the number of particles within said given range of sizes suspended in the translucent medium.

4. Apparatus for determining the number of microscopic particles, within a given range of sizes, suspended in a translucent medium, comprising, in combination, optical means, including a source of light of a predetermined wave length, for directing a beam of said light along the optical axis of said optical means; support means for supporting a quantity of the translucent medium, with microscopic particles within said range of sizes suspended therein, at a predetermined point along said optical axis in the path of said beam of light so that the latter passes through said medium and is partly diffracted by the particles suspended in the medium; a member arranged on said optical axis on the opposite side of said support means from said source of light in the path of said light beam emerging from a quantity of the translucent medium carried by said support means, said member having an arcuate edge portion forming part of a circle whose center is in said optical axis, and said member being located from said support means at an optic axis distance which forms with a straight line extending from said predetermined point to a point on said arcuate edge portion an angle within and outside of which the intensity of said light beam is independent of the size of the particles within said given range of sizes while being dependent on the quantity of particles, whereby an inner portion of the light emerging from a quantity of translucent medium carried by said support means extends radially inwardly from said arcuate edge portion and an outer portion of light extends radially outwardly from said inner portion of light; and photoelectric means for measuring the intensity of at least one of said portions of light, whereby the thus measured light intensity is capable of directly indicating the number of particles within said given range of sizes suspended in the translucent medium.

5. Apparatus as recited in claim 4 and wherein the sine of said angle is equal to 0.82 times the wave length of said light beam divided by the mean diameter of the microscopic particles within said given range of sizes.

6. Apparatus as recited in claim 4 and wherein a second member having an arcuate edge portion forming part of a circle whose center is in said optical axis is located at said optic axis distance from said support means radially outwardly from said arcuate edge portion of said first-mentioned member, so that a straight line extending from said predetermined point to a point on said arcuate edge portion of said second member forms with the optical axis a second angle greater than said first-mentioned angle, said outer portion of light extending radially outwardly from said inner portion of light to said arcuate edge portion of said second member.

References Cited in the file of this patent

UNITED STATES PATENTS

| | | |
|---|---|---|
| 1,974,522 | Twyman et al. | Sept. 25, 1934 |
| 2,064,517 | Brice | Dec. 15, 1936 |
| 2,073,223 | Rose | Mar. 9, 1937 |
| 2,080,613 | Lange | May 18, 1937 |
| 2,157,438 | Sparks | May 9, 1939 |
| 2,254,062 | Devol | Aug. 26, 1941 |
| 2,311,101 | Tuttle et al. | Feb. 16, 1943 |
| 2,313,218 | Brace et al. | Mar. 9, 1943 |
| 2,324,449 | Westerland | July 13, 1943 |
| 2,333,791 | Hutchison | Nov. 9, 1943 |
| 2,379,158 | Kalischer | June 26, 1945 |

FOREIGN PATENTS

| | | |
|---|---|---|
| 396,390 | Great Britain | Aug. 1, 1933 |
| 479,662 | Great Britain | Feb. 9, 1938 |
| 856,507 | France | Mar. 23, 1940 |